(12) United States Patent
Sopic et al.

(10) Patent No.: US 12,524,420 B2
(45) Date of Patent: Jan. 13, 2026

(54) SYSTEM AND METHOD FOR SOCIAL MEDIA FORENSICS

(71) Applicant: Sandvine Corporation, Waterloo (CA)

(72) Inventors: Marko Sopic, Dubai (AE); Robert Oreb, Dubai (AE); Kathiravan Rajasekar, Bangalore (IN); Varun Kumbheshwar, Bengaluru (IN)

(*) Notice: Subject to any disclaimer, the term of this patent is extended or adjusted under 35 U.S.C. 154(b) by 0 days.

(21) Appl. No.: 18/173,914

(22) Filed: Feb. 24, 2023

(65) Prior Publication Data

US 2023/0273935 A1      Aug. 31, 2023

(30) Foreign Application Priority Data

Feb. 25, 2022   (IN) .............................. 202211010323
Feb. 17, 2023   (EP) .................................... 23157414

(51) Int. Cl.
| | |
|---|---|
| *G06F 16/00* | (2019.01) |
| *G06F 16/2457* | (2019.01) |
| *G06F 16/248* | (2019.01) |
| *G06Q 50/00* | (2012.01) |

(52) U.S. Cl.
CPC ...... *G06F 16/248* (2019.01); *G06F 16/24578* (2019.01); *G06Q 50/01* (2013.01)

(58) Field of Classification Search
CPC .. G06F 16/248; G06F 16/24578; G06Q 50/01
USPC ................................. 707/600–899
See application file for complete search history.

(56) References Cited

U.S. PATENT DOCUMENTS

| | | | |
|---|---|---|---|
| 2003/0105769 A1* | 6/2003 | Harris | G06Q 10/10 707/999.102 |
| 2009/0007263 A1* | 1/2009 | Frenkel | H04M 3/2281 726/22 |
| 2010/0088364 A1* | 4/2010 | Carter | H04L 63/105 709/217 |
| 2011/0125775 A1 | 5/2011 | Lance et al. | |

(Continued)

FOREIGN PATENT DOCUMENTS

WO      2014015245 A1      1/2014

OTHER PUBLICATIONS

Extended European Search Report, European Patent Office, on corresponding EP Application No. 23157414.6 dated Jul. 10, 2023.

*Primary Examiner* — Michelle N Owyang
(74) *Attorney, Agent, or Firm* — Amarok IP Inc.; Neil W. Henderson

(57) ABSTRACT

A method and system for social media monitoring, the method including: collecting data associated with a social media upload; determining subscriber identity information associated with the social media upload; creating an IPDR based on the subscriber identity and social media upload data; receiving a query having at least one social media upload event; determining at least one subscriber identity that may be associated with the upload event; and providing the at least one subscriber identity as a result of the query. The system includes: a collection module configured to collect data; an analysis module configured to determine subscriber identity information and create an IPDR based on the subscriber identity and social media upload data; and a query module configured to receive a query having at least one social media upload event, determine at least one subscriber identity that may be associated with the upload event.

16 Claims, 6 Drawing Sheets

(56) References Cited

U.S. PATENT DOCUMENTS

| | | | |
|---|---|---|---|
| 2016/0042253 A1* | 2/2016 | Sawhney | G06F 18/2323 |
| | | | 382/190 |
| 2016/0275594 A1* | 9/2016 | Mullakkara Azhuvath | ............... |
| | | | G06F 16/248 |
| 2020/0082121 A1* | 3/2020 | Hanafee | G06Q 30/018 |
| 2021/0117477 A1* | 4/2021 | Rastogi | G06Q 20/229 |
| 2022/0058226 A1* | 2/2022 | Ben-Natan | G06F 16/24573 |

* cited by examiner

SYSTEM AND METHOD FOR SOCIAL MEDIA FORENSICS

FIELD

The present disclosure relates generally to management of computer network traffic. More particularly, the present disclosure relates to a system and method for social media monitoring and forensics.

BACKGROUND

Ways of communication have changed dramatically in the past decade, and it has been noted that the speed of change is increasing. The manner in which information is shared and communicated has moved online, and the Internet is being used as a common media to propagate information, as messages, content, and the like. Unfortunately, this technology revolution is not only being used to benefit social interaction, but is also being used by people to support activities such as spreading "fake" news, incorrect or destructive propaganda, illegal activities, and the like. In some cases, such activities may occur on social media platforms such as Twitter™, YouTube™, and many others.

The Internet is accessible from almost everywhere. Home internet connections, mobile access, public hotspots are all available to people wanting to access online information. From a technological perspective, when observing data traffic, it can be important to correlate traffic of interest with a subscriber/end user. Service providers generally attempt to register access points to the network, assigning a subscriber/responsible party, from broadband access to mobile number subscribers, and the like. Unfortunately, and partly due to encryption, it can be difficult to identify an end user/responsible party. In order to better understand a connection or correlation over time of subscriber's and their associated social media traffic, there is a need for an improved method and system for social media monitoring and forensics.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for social media monitoring in a computer network, the method including: collecting data associated with a social media upload; determining subscriber identity information associated with the social media upload; creating Internet Protocol Detail Records (IPDR) based on the subscriber identity and social media upload data; receiving a query having at least one social media upload event; determining at least one subscriber identity that may be associated with the upload event; and providing the at least one subscriber identity as a result of the query.

In some cases, the query may be received from a Law Enforcement Agency.

In some cases, the at least one social media upload event may include a time of the upload event. In some of these cases, the time of the upload event may include a preconfigured time window based on the time of the upload event.

In some cases, the at least one social media upload event may include a size of the upload event. In some of these cases, the size of the upload event may include a preconfigured size range for the header and data of the upload event.

In some cases, the query may include a plurality of upload events and results may include a plurality of subscriber identities wherein the subscriber identities are ranked based on the number of events to which they are associated.

In some cases, the results may include a confidence level as to the likelihood the subscriber identity is a match.

In some cases, the query comprises a plurality of social media platforms.

In another aspect, there is provided a system for social media monitoring in a computer network, the system includes: a collection module configured to collect data associated with a social media upload; an analysis module configured to determine subscriber identity information associated with the social media upload and create Internet Protocol Detail Records (IPDR) based on the subscriber identity and social media upload data; and a query module configured to receive a query having at least one social media upload event, determine at least one subscriber identity that may be associated with the upload event; and provide the at least one subscriber identity as a result of the query.

In some cases, the query module may receive the query from a Law Enforcement Agency.

In some cases, the collection module may determine a time of upload event for the at least one social media upload event. In some of these cases, the time of the upload event comprises a preconfigured time window based on the time of the upload event.

In some cases, the collection module may determine a size of the upload event for the at least one upload event. In some of these cases, the size of the upload event may include a preconfigured size range for the header and data of the upload event.

In some cases, the query module may be configured to receive the query with a plurality of upload events and results may include a plurality of subscriber identities wherein the subscriber identities are ranked based on the number of events to which they are associated.

In some cases, the query module may be configured to include a confidence level as to the likelihood the subscriber identity is a match.

In some cases, the query module may provide a query over a plurality of social media platforms.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1:
FIG. 1 illustrates a social media feed with a timestamp.

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system for social media monitoring and forensics. Embodiments of the system and method are configured to receive and monitor Internet Protocol (IP) traffic from the network. In some cases, all IP traffic for a jurisdiction, such as a network, a geographical setting, a country, or the like. The data is correlated, and IP session matching may be determined. The Internet Protocol Data Record (IPDR) is intended to be stored per session. Embodiments of the system and method may receive a request to query the information. The request may be received from a law enforcement agency (LEA) or another agency with ability to request information from the network provider or Internet service provider (collectively referred to as "LEA" or "agency"). Embodiments of the system and method are configured to match the query with any previously stored records and provide the information to the LEA or the like.

It has been noted that online communication can be used for inappropriate content. There are those that misuse social media applications and may conduct illicit business via various online social media applications. In many/most cases, it can be difficult to align subscriber information with social media postings and/or virtual username if the user is trying to remain anonymous or hide their identity. As such, discovery/uncovering this information is often beneficial to law enforcement agency investigations.

Devices being used to access the Internet are generally physically addressed, on a hardware level, with fixed addresses, such as a MAC (Media Access Control) address, an IMEI (International Mobile Equipment Identity), or the like which are predefined during manufacturing and limited per device. There is also a second level of identities, for example, assigned IP addresses, port numbers, phone number or the like. This second level of identity may not be fixed, but, in the majority of cases, these second level identities are tracked in terms of assignments. At a further level, there are online identities, for example, usernames, chat nicknames, email addresses, social media accounts, and the like. These identities are virtual and created by and for the users, with normally a liberal set of limitations. In many cases, any user can have as many online identities as desired, and for that reason, it may be challenging to correlate online identities to a particular person (to a person's physical identity).

When communicating online, subscribers often use virtual identities to represent themselves. With content being encrypted on many of the popular applications and protocols, the identity and/or content can be hidden from classical lawful interception techniques. Conventional solutions may only provide visibility on, for example, a protocol identification level. Other data, for example, application control plane and content itself (including usernames or the like) are invisible and end to end encrypted. Conventionally, this hidden data may enable malicious people easy ways to communicate without being noticed by the law enforcement agencies (LEAs). Because of that, traditional ways to intercept or analyze data for specific virtual identities can be limited. A table illustrating examples of physical and virtual identities is shown in below.

| Identities | |
| --- | --- |
| Physical | Virtual |
| MSISDN | username |
| IMEI | email address |
| IMSI | nickname |
| ADSL | avatar |
| MAC address | |

In some cases, law enforcement agencies observe illegal activities online and may be able to link a virtual identity to the malicious activity (for example, video upload), and would like to understand where and who is associated with the malicious activity. Embodiments of the system and method detailed herein are intended to perform this correlation to provide desirable information to the LEA or other authorized agency.

Embodiments of the system and method are intended to focus on upload activities made by subscribers as these activities can be detected more easily. Upload activity has been shown to generate a burst in uploaded packets in a short period of time. Embodiments of the system and method are intended to be independent of any specific social media platform. As such, embodiments of the system and method are intended to be usable across various services subscribers used to post public and private content online. If there is private contented posted online, it will be assumed that the LEA or other authorized agency has been provided the access they need and been able to view the content and has the data required to request a query of the system as detailed herein.

It will be understood, the larger the upload the easier the upload is to detect and log properly. Smaller text-based messages, for example messages under a predetermined threshold such as, for example, 25 kilobytes, 20 kilobytes, 15 kilobytes or the like, may be harder to detect and log as an upload activity.

Once the system and method are set up in a network, the system and method can be configured to collect records for all or a subset of upload events in the network. Embodiments of the system and method are configured to correlate the upload events with subscriber identities.

In an example use case, a malicious user may be conducting illicit activity online. A law enforcement agency may collect various timestamps of uploads for the malicious user. Embodiments of the system and method are intended to determine a shortlist of subscriber identities that match the collected upload time and/or approximate upload size. The upload size may be modified to include overhead due to different transfer protocol headers that get counted for file size of an upload. The shortlist of identities may include probability per result, and as a result can have multiple outcomes as a best effort outcome.

Conventionally, prior to encryption being so heavily used, details like usernames were transferred in plain text over an IP network, allowing law enforcement agencies to inspect data payloads. Conventionally, it was simple to correlate username and client side IP, which was later used to identify subscriber physical identify for example, an MSISDN or the like.

More recently, social media platform providers have shifted heavily towards encryption. Further, end users mostly use different Open Source Intelligence (OSINT) techniques and solutions, where data is being crawled online, in order to link any meaningful information with targeted username. Such techniques also reveal significant other details about suspects, however, when suspects are careful and do not use simple or easy to determine usernames or other identifying information. The outcome received by the LEA may be very limited. As such, LEA's are often required to approach social media platform providers to share user details, however, that process is subject to heavy auditing, and a complex procedure. In some cases, where the LEA and the social media platform provider are in different jurisdictions, it can be difficult to secure the necessary information.

Embodiments of the system and method detailed herein are not intended to review or interpret data of upload. Instead, embodiments of the system and method are intended to review data associated with either a public or private upload to understand a time when each upload happened from an observer perspective (or from the perspective of the Internet). In an example where a targeted username is a part of a private virtual group and posting content is hidden, it is assumed law enforcement agency managed to infiltrate the group by appropriate means and the system and method is reviewing the timestamps of online events/uploads for account performing illegal activities, but not the hidden or private content.

FIG. 1 illustrates a typical social media posting. When a subscriber decides to share a message, a picture, or other content over a social media service the message generally contains a timestamp, which may be visible as shown in FIG. 1. The system is configured to detect the activity, the posting or other upload in real time and generate a record which includes details associated with the posting.

The system is intended to store the upload events with respective correlated identities. The system is configured to store the records for a set area, for example, the network, the jurisdiction, the country or the like. The system is configured to disregard non upload traffic in order to focus on record generation for uploads on social media.

Figure 2:
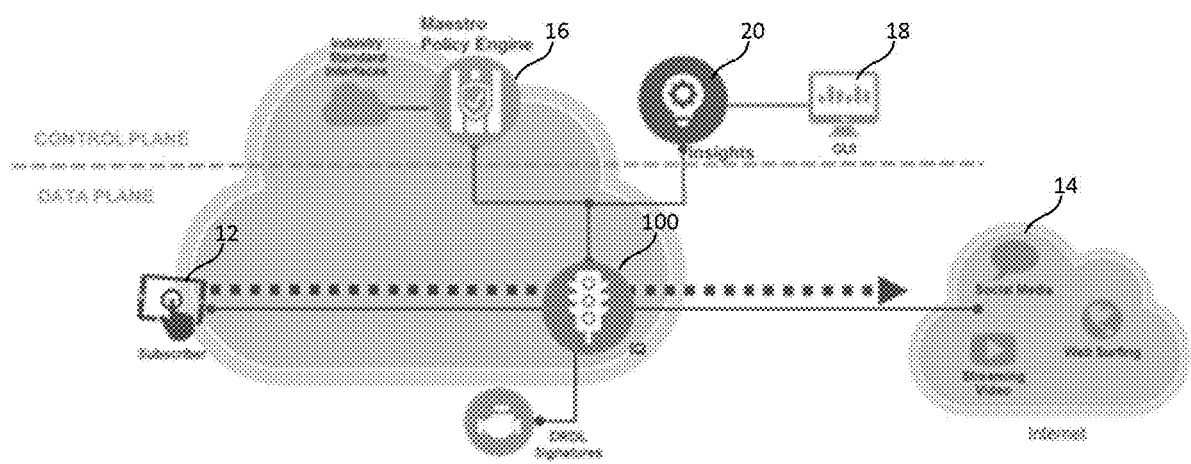
FIG. 2 illustrates a system for monitoring social media according to an embodiment in a network environment.

FIG. 2 shows a diagram of a computer network architecture 10. It will be understood that at least one subscriber 12 accesses the Internet 14. As the traffic is transmitted from the subscriber to the Internet, various network devices review and route the traffic to the correct location. One such network device is the system 100 which is further intended to be connected to a policy engine 16. The system may further be connected to a user interface 18 which may be able to review and query the information stored by the system. This access may be routed through a different network device 20. The system 100 is configured to be as transparent as possible to the users. It will be understood that FIG. 2 illustrates a high level network architecture and that a computer network may include further aspects not illustrated.

A system 100 for monitoring social media postings is intended to reside in the data plane. In particular, the system 100 may be an inline probe in a location where the system is able to access the data noted herein for social media traffic flows. In other cases, the system may be offline and fed data from another network device. It will be understood that in some cases the system may be a physical network device or may be a virtual networking device. It will be understood that the system may be used on any IP based networking system, for example, Wi-Fi based, mobile data networks like GPRS, CDMA, 4G, 5G, LTE, satellite based, WLAN based networks, fixed line broadband fiber optic networks as well as on virtual private networks.

It is intended that the system may include a defined retention period. For the defined retention period, the system may collect all upload events that happened in the network. In a specific example, the defined retention period may be 12 months which is intended to provide for 12 months of data for law enforcement agencies to perform an investigation covering past 12 months of activities. Different periods of time may be used based on the configuration of the system and the amount of time law enforcement agencies wish to have the data retained.

Figure 3:
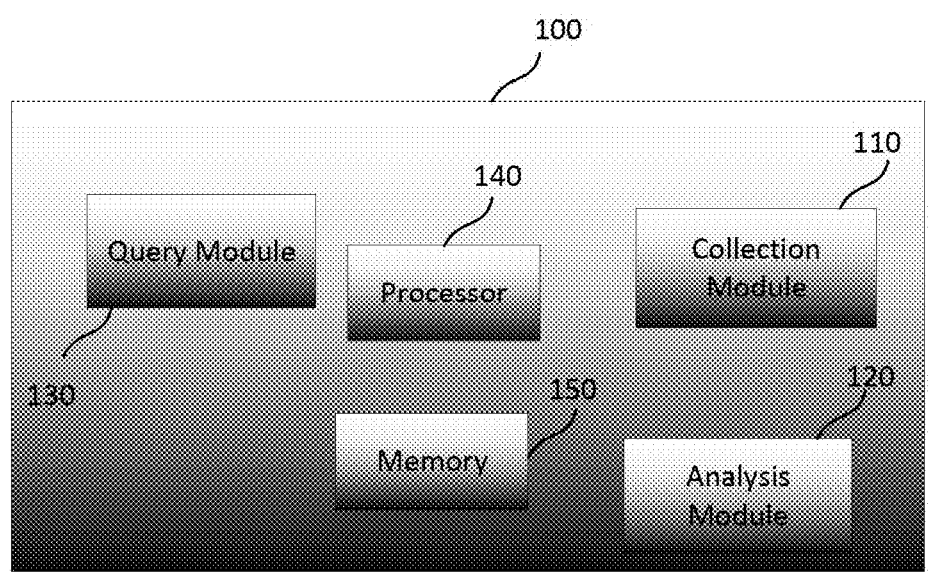
FIG. 3 illustrates an embodiment of a system for monitoring social media.

FIG. 3 illustrates an example embodiment of the system 100. The system is intended to include a collection module 110, an analysis module 120, a query module 130, at least one processor 140 and at least one memory component 150. The system is generally intended to be distributed and reside in the data plane. A central processing unit or the control processor may be configured to execute the instructions stored in the memory component in order for the modules to execute their functions. The system 100 is intended to receive information from the computer network equipment that allows the system to determine policy rules and prioritization rules for the network.

The collection module 110 is configured to collect upload activities and determine a time stamps associated with the upload activity. The collection module may determine whether the traffic flow is related to upload activity by analyzing upload packet patterns from subscribers. The collection module 110 is configured to review the traffic flow to determine which traffic flows are related to upload activity. If the collection module 110 is reviewing and collecting data related to Virtual Private Network (VPN), the collection module may treat all traffic as upload traffic if there is less visibility into the type of traffic activity of the traffic flow. In other cases, the system may receive information from a different network device providing further detail with respect to the application type or upload activity within a VPN.

The analysis module 120 is configured to determine and match the upload activity with subscriber data. The analysis module 120 may create an IPDR which includes information associated with the activity and subscriber data. In some cases, the record may include at least some of the following information:

Protocol;
Timestamp;
Client IP address;
Mobile identity (MSISDN, IMEI, IMSI)/ADSL username);
Location (Cell ID);
Amount of data;
and/or other data relevant to the upload or subscribers.

If attributes are missing the analysis module is intended to use best effort basis to provide as complete an IPDR as possible.

The query module 130 is configured to receive a query from an LEA or other authorized agency and review the data determined and stored by the analysis module to determine query results. The results may include a plurality of IPDRs that match the query parameters, for example, upload time and upload size, within a predetermined threshold. In some cases, the query module 130 will also provide the results with a confidence level as to how accurate the results may be.

Figure 4:
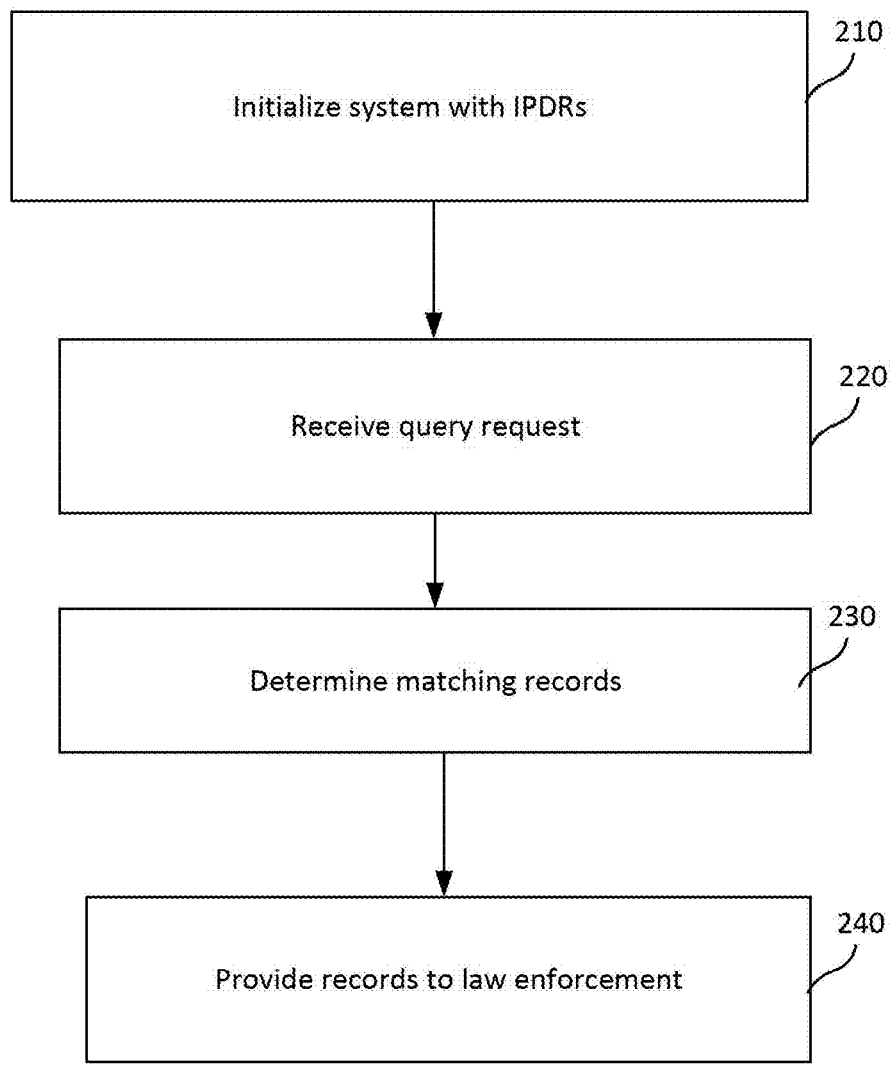
FIG. 4 illustrates a flow chart of a method for monitoring social media according to an embodiment.

FIG. 4 illustrates a flow chart of a method for social media monitoring and forensics. The collection module 110 is configured to collect data associated with social media uploads while the analysis module 120 to initialize the system with IPDRs, at 210. At 220, the query module 130 receive a query from a LEA via, for example, via a user interface. At 230, the query module determines matching records and at 240, the records are provided to the law enforcement agency.

Records are sorted in a manner that is intended to provide visibility to the identities that matched a set of defined events more frequently with identities that matched fewer events shown later. This outcome and set of identities may be provided to an LEA analyst to allow the LEA to consider or confirm leads that may require further investigation and confirmation. For example, in a case where a criminal is trying to hide his identity and goes to a specific coffee shop every time, he wants to post illegal content. Eventually, a coffee shop's broadband username will be resolved as a targeted identity. LEA agents may then go to the coffee shop to request video surveillance details. A further example may be a situation where the top ranked identities are a mobile number and a home broadband account of a same person. There is a high probability this individual may be the targeted suspect.

Figure 5:
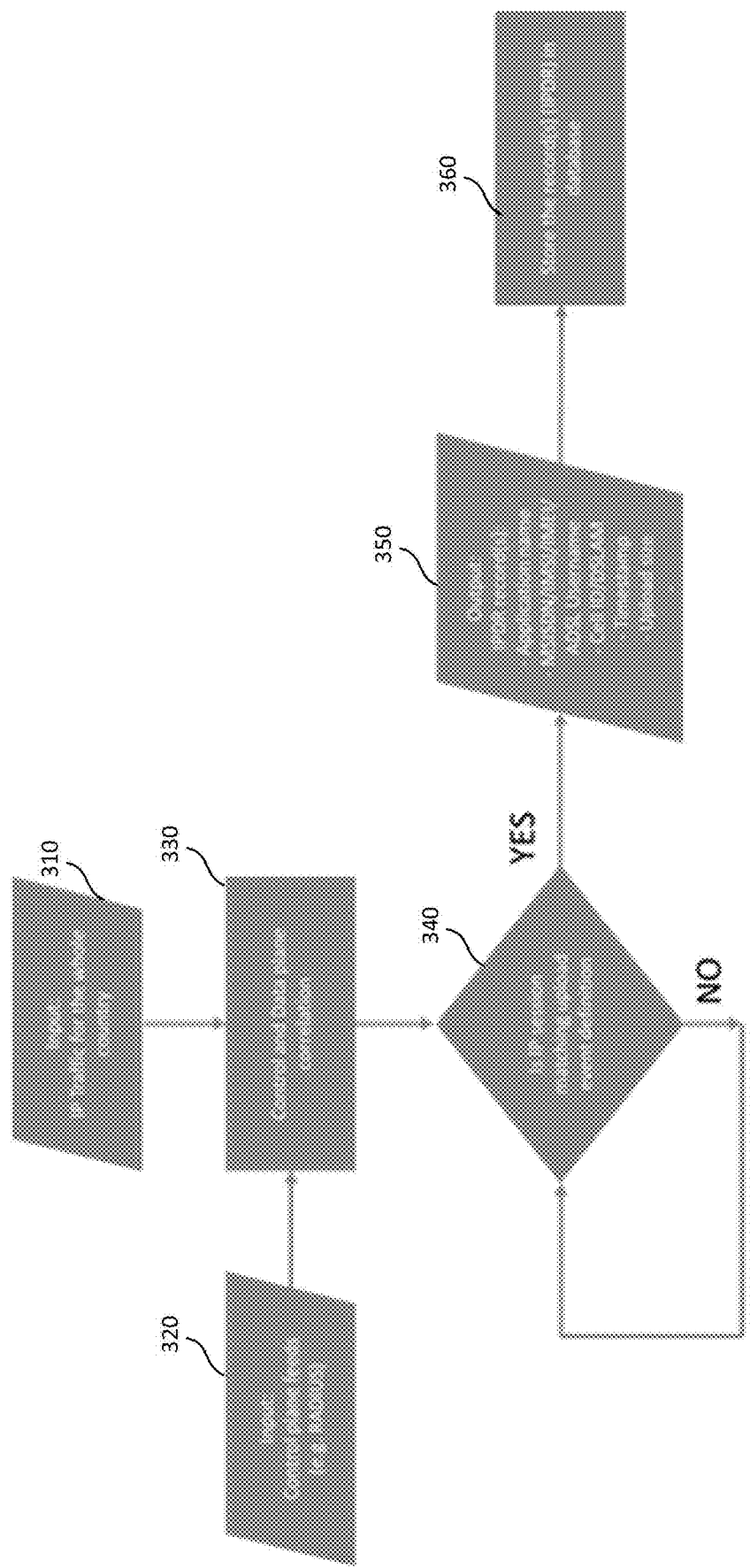
FIG. 5 illustrates a method for initializing a system for social media investigation according to an embodiment.

FIG. 5 is a flow chart of a method for configuring and initializing the system. In FIG. 5, the example jurisdiction is meant to be an entire country. At 310, the traffic from the whole country is monitored for uploads. At 320, the system is fed or requests data from the control plane regarding the subscriber information to the collection module. At 330, the analysis module is configured to correlate the control plane and data plane information. At 340, the analysis module is configured to determine if the IP session matches an upload event. If not, the traffic flow is ignored or allowed to pass without further review. If the IP session matches an upload event, the analysis module is configured to create an IPDR record at 350. The record is intended to include identifying attributes of the subscriber as well as the upload event, such as, application name, time stamp, upload size and the like. The record is then stored in a database, at 360, as data that may be queried by an appropriate law enforcement agency.

Once a law enforcement agency identifies a username on social media that is posting illegal content. The system may access and record all uploads made by the targeted account. With the collected data, the collection module is configured to create an event for every upload observed. Once a query is received from the LEA, the query module is configured to process events within the query and review the stored records with the same or similar timestamp and upload size where possible. Each event can have more than one matching identity. All those identities are grouped for each event. As the output, the query module may process the events as sets of identities showing end user whose identities where present across a plurality of the upload events, listing more frequent identities as higher likelihood of being a match. It can be the case where 0 identities matched 100% or all upload events associated with the query created. In that scenario the system allows end users to analyze identities with hit rates above a preconfigured threshold.

Thresholds may be dependent on the network latency and may be established based on testing. With respect to a threshold size of an upload, the size of the upload includes overhead which may be determined based on the additional transport headers. In some cases, at a high level this may be up to approximately 15 to 20% of the upload amount. The system and method are intended to compare and provide updates to this threshold, for example, via testing and comparison of results to fine tune the threshold.

As an example, simplified correlation logic shown can be presented over mathematical expression:

$$\bigcap_{i=1}^{n} A_i$$

where set A represents a defined set of events, where each event is a collection of uploads made (by all subscribers in a set) in period of time defined by analyst:

$$A = [u_{t0}, u_{t1}, u_{t2}, u_{t3} \ldots u_{tl}]$$

In this case, t0 . . . tl represent all timestamps of all uploads (u) made within a predefined time period. For example, if targeted upload was made at 03:00 o'clock, the upload window may be set to, for example, 02:58-03:02. Once that is done, t0 . . . tl represent accurate timestamps of all events uploaded within the 4 minutes of the upload time window or time threshold. At the same time, when analyzing, it may be determined that the size of file uploaded was 1 MB. For upload size, the threshold size window may be set to between 0.98 MB-1.3 MB.

The variable n in the first expression represents the total number of all events. Every event A may contain information on identities matching the event criteria. The outcome of the system is intended to be the top ranked identities, which were present in most of events A.

The query module is intended to review records that may be similar but not identical due to network latency, or time being out of sync, or the like, event time is defined as a customizable window. For example, if the LEA has an even recorded time of an upload on a social media platform at 08:45:12, when creating an event, the query module or system may set the time frame to within a few seconds of the recorded time, for example 08:44:00-08:48:00. It will be understood that the 4 minute window is intended to be configurable and based on the network latency and potential system clocks on different solutions being out of sync. In some cases, it may be as low as 5 or 10 or 30 seconds while it may also be larger than the example, for example 5, 10 or 15 minutes. In some cases, granularity available on the social media platforms can be in minutes only, in that case, the timeframe may be an event timeframe with threshold of few minutes, for example, 1 minute, 2 minutes, 5 minutes or the like.

A further preconfigured threshold may be used for applicable for the upload size. As such, when defining an event, the LEA or query module may set a start and end time, as well as minimum and maximum upload size as an event definition.

Figure 6:
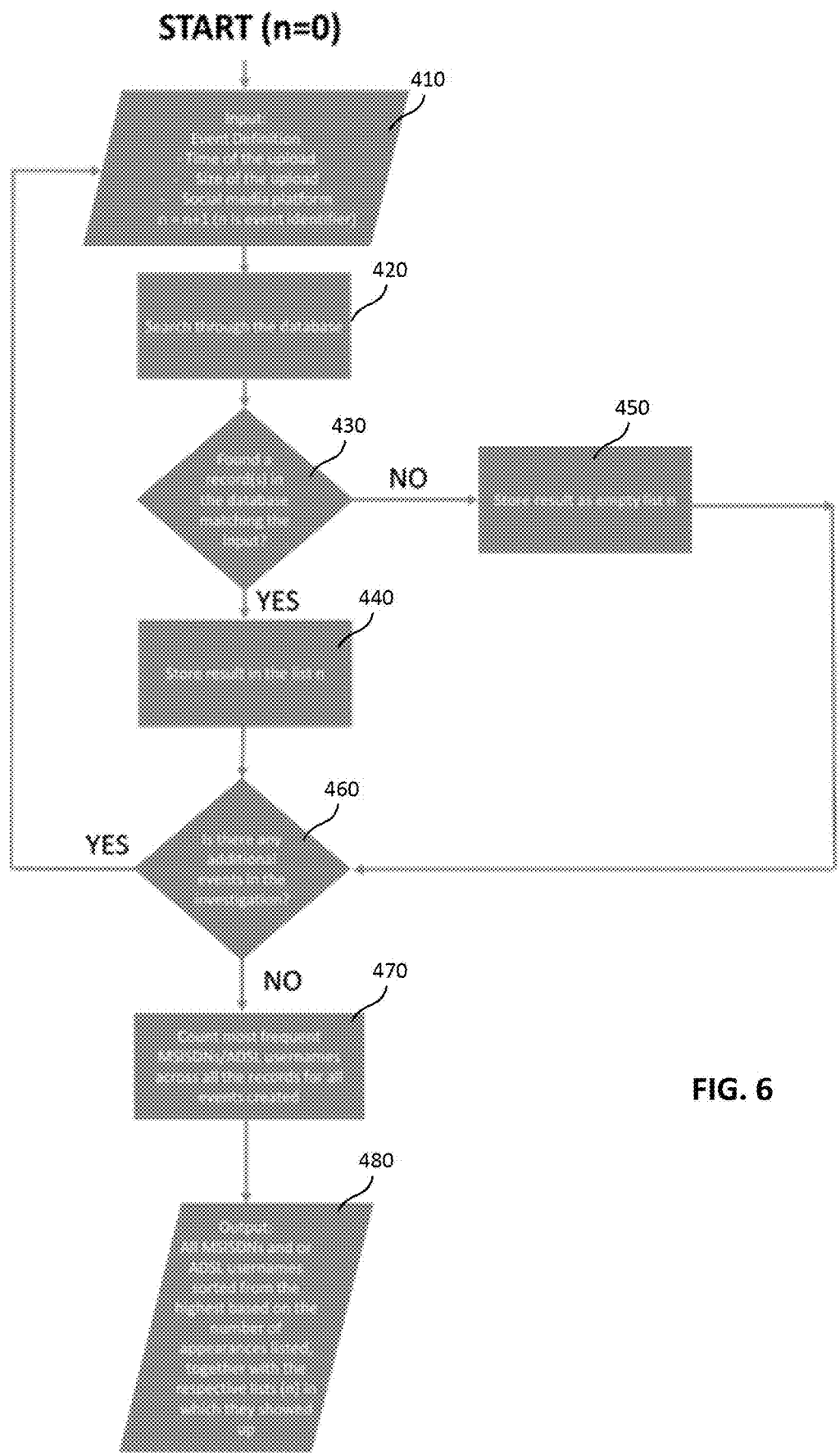
FIG. 6 illustrates a method for determining social media forensic information.

FIG. 6 illustrates a method for determining a query match according to an embodiment. At 410, the query module receives a query which is intended to include at least one event definition. The event definition is intended to include details about the upload activity, including for example, the time of the upload, the size of the upload, the social media platform, and the like. The query module is also configured to store a count which provides for the number of matching results. At 420, the query module will search the previously stored. At 430, it will determine whether any records include matching data to the event definition. At 440, the query module will cause a matching record to be stored in a list. If no records match, the query module is configured to store an empty list, at 450. In some cases, the records will be reviewed for social media platforms and any record that does not match the platform or application will be disregarded.

At 460, the query module will determine if there are any additional events to review and will continue to review the stored records until all the records have been reviewed. At 470, if the query module has determined that all events have been reviewed, the query module will determine the most frequent subscriber identities, for example MSISNs, ADSL usernames and the like across all records for each of the events within the query. At 480, the system is configured to provide the subscribers identities and the number of appearances each identity had in the list. In some cases, the list may be sorted with the subscriber with the highest appearances first on the list. In some cases, if there is a significant number of events and therefore a significant number of possible subscribers, only subscribers that are in a threshold number of events are included in the list. In some cases, the threshold number could be 25% of the events, 50% of the events, 75% of the events or the like. In other cases, the list may be truncated after a top threshold number is included, for example, the top 2 subscribers, the top 5 subscribers, the top 10 subscribers or the like.

In still other cases, there may not be any results for the query which may imply that no subscriber has upload activity corresponding to the upload events. In this case, it may be due to no subscriber in the network or in the reviewed jurisdiction are associated with the illicit uploads. This may be due to the uploads being completed outside the monitored network or jurisdiction. In this case, the system may inform the LEA that there are no appropriate matches to the query.

It will be understood that the results from the query are intended to provide an LEA a generation of a new lead and/or possible direction for the investigation, but not to provide evidence for a criminal trial or other court proceeding. With the output from the system, the LEA may further process shortlisted identities in the attempt to confirm correlation, and the target of any illicit behavior.

Figure 7:
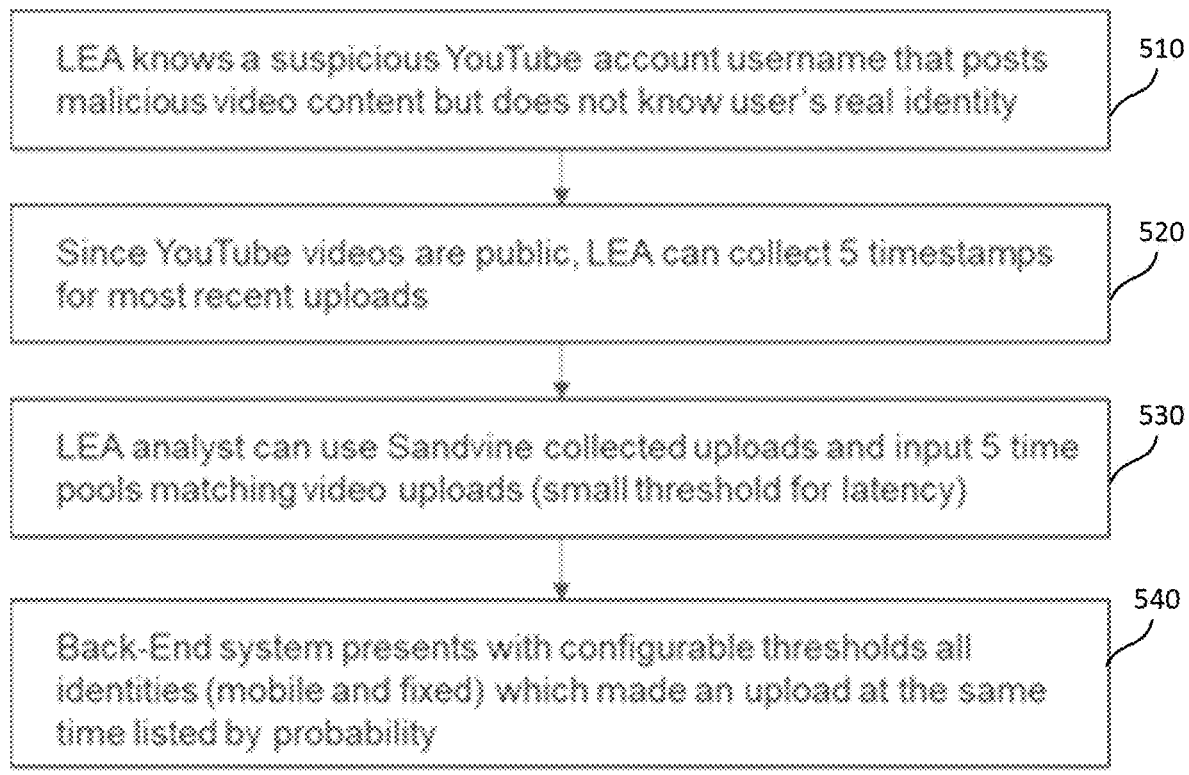
FIG. 7 is a flow chart of an example use case of a method for social media monitoring.

Embodiments of the system and method may provide for more accurate results with a larger set of events in a query. With more events combined, the mathematical probability of identifying a suspect correctly increases. At the same time, the amount of noise and false positives decreases with added events. Events can be defined over multiple social media platforms as a part of a single investigation and a single query, where LEA suspects username A on social media platform X and username B on social media platform Y are the same person FIG. 7 is a flowchart that of an example legal enforcement agency having seen issue with a YouTube™ account. At 510, It is determined that the LEA knows of a suspicious YouTube account username that posts illegal or malicious video content but is unaware of the user's identity.

At 520, the LEA collects a number of timestamps of recent uploads as the YouTube videos are public and the upload times can be determined by the posting. In some cases, the LEA may collect at least 5 timestamps of videos but more or less could be collected. At 530, the LEA creates a query to be received by the query module to determine matching records to the video uploads. In most cases a small threshold will be included to take into account the latency of the network. At 540, the system provides the LEA with a list of identities that are within the configurable threshold of the query sent by the LEA. In some cases, the list will be prioritized as to which subscribers are more likely to be associated with the user.

In addition to timestamps, where possible, the system is also intended to measure the size of the upload event. Adding a size element to the upload event definition criteria is intended to reduce the number of false positives.

When a VPN is used during an upload event, the accuracy of any result may depend on the amount of noise inside the VPN tunnel associated with the upload. Uploads made over VPN can be matched with uploads over any social media platform, however, the confidence level of the match lowers when the investigation events happen over VPN due to lack of reliability. Activity over VPN has been shown to generate less accurate data for correlation purposes. When VPN is full of traffic sourced from multiple applications and users, it is much harder to identify targeted events and generated required information.

In some cases, a confidence level may be provided, for example the confidence of a result on a scale between 0-100. It will be understood that various scales may be used. If the upload is done over VPN the confidence level on the scale may be significantly lower than uploads not done through VPN. In some cases, there may be further information available regarding the VPN upload, for example via, machine learning. If more information is available, the confidence level may increase accordingly.

Embodiments of the system and method do not include any tactical, or intrusive techniques, and are configured to protect user privacy, as the content of the upload is not analyzed in any way.

Embodiments of the system and method are intended to be protocol independent. By being protocol independent, it is intended that the system and method may be sustainable over the long term. This is unlike some conventional solutions where APIs can be removed, or crawlers actively blocked by the social media vendors thus limiting the access and usability of these conventional systems.

Social media platform vendors are also subjected to political alliances the government has, and not always keen on sharing data with less friendly government bodies worldwide in the countries they still operate. The solution herein is intended to be politically independent and gives any legal entity the ability to fight crime in a more effective way without being depended on the "help" from the outside of the country.

It is intended that the system and method detailed herein can be used in an inline or offline setup. If in an offline setup the system may be fed traffic flow data from a network device which receives and reviews the traffic flows.

In some cases, the system may further collect or store data from manual packet captures (Pcap). In some cases, the system can identify upload events inside various Pcap samples in a similar way to collecting real time or traffic flow data. From this, the collection module may still be able to collect the Pcap samples which may be analyzed by the analysis module and used for a query in the manner detailed herein.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for social media monitoring in a computer network, the method comprising:
    collecting data associated with an encrypted social media upload;
    determining subscriber identity information associated with the encrypted social media upload;
    creating an Internet Protocol Detail Records (IPDR) based on the subscriber identity and encrypted social media upload data, wherein the IPDR comprises: a size of the encrypted social media upload;
    receiving a query having at least one encrypted social media upload event;
    modifying an upload size of the query based on overhead due to transfer protocol headers;
    determining at least one subscriber identity that may be associated with the at least one encrypted social media upload event, wherein the at least one encrypted social media upload event comprises a preconfigured size range for a header and data of the at least one encrypted social media upload event that matches the IPDR; and
    providing the at least one subscriber identity from the IPDR associated with the at least one encrypted social media upload event as a result of the query.

2. A method according to claim 1 wherein the query is received from a law enforcement agency.

3. A method according to claim 1 wherein the at least one encrypted social media upload event comprises a time of an upload and the IPDR comprises a timestamp; and
    determining the at least one subscriber identity comprises matching the time of the upload with the timestamp of the IPDR.

4. A method according to claim 3 wherein the time of the upload comprises a preconfigured time window based on the time of the at least one encrypted social media upload event.

5. A method according to claim 1 wherein the size of the upload is modified based on different transfer protocol headers and the IPDR comprises a protocol for the encrypted social media upload; and
    determining the at least one subscriber identity comprises matching the transfer protocol header with the protocol of the IPDR.

6. A method according to claim 1 wherein the query comprises a plurality of encrypted social media upload events and results comprise a plurality of subscriber identities wherein the subscriber identities are ranked based on a number of events to which the subscriber identities are associated.

7. A method according to claim 1 wherein the results include a confidence level as to a likelihood that the subscriber identity is a match.

8. A method according to claim 1 wherein the query comprises a plurality of social media platforms.

9. A system for social media monitoring in a computer network, the system comprising at least one processor connected to at least one memory storing instructions executable by the at least one processor to implement a plurality of modules comprising:
    a collection module configured to collect data associated with an encrypted social media upload;
    an analysis module configured to determine subscriber identity information associated with the encrypted social media upload and create an Internet Protocol Detail Records (IPDR) based on the subscriber identity and social media upload data, wherein the IPDR comprises: a size of the encrypted social media upload; and
    a query module configured to receive a query having at least one encrypted social media upload event, modifying an upload size of the query based on overhead due to transfer protocol headers, determine at least one subscriber identity that may be associated with the at least one encrypted social media upload event, wherein the at least one encrypted social media upload event comprises a preconfigured size range for a header and data of the at last one encrypted social media upload event that matches the IPDR; and provide the at least one subscriber identity from the IPDR associated with the encrypted social media upload event as a result of the query.

10. A system according to claim 9 wherein the query module is configured to receive the query from a law enforcement agency.

11. A system according to claim 9 wherein the collection module is configured to determine a time of an upload for the at least one encrypted social media upload event and the IPDR comprises a timestamp; and
    determining the at least one subscriber identity comprises matching the time of the upload with the timestamp of the IPDR.

12. A system according to claim 11 wherein the time of the upload comprises a preconfigured time window based on the time of the at least one encrypted social media upload event.

13. A system according to claim 9 wherein the size of the upload is modified based on different transfer protocol headers and the IPDR comprises a protocol for the encrypted social media upload; and
    determining the at least one subscriber identity comprises matching the transfer protocol header with the protocol of the IPDR.

14. A system according to claim 9 wherein the query module is configured to receive the query comprising a plurality of encrypted social media upload events and determine results comprising a plurality of subscriber identities wherein the subscriber identities are ranked based on a number of events to which the subscriber identities are associated.

15. A system according to claim 9 wherein the query module is configured to determine a confidence level as to a likelihood that the subscriber identity is a match.

16. A system according to claim 9 wherein the query module is configured to determine results over a plurality of social media platforms.

* * * * *